March 31, 1953   W. WELLS   2,633,525
APPARATUS AND METHOD FOR PROBING A RADIATED WAVE FIELD
Filed July 12, 1949   5 Sheets-Sheet 1

INVENTOR.
WINSTON WELLS
BY Mock & Blum
ATTORNEYS

March 31, 1953 W. WELLS 2,633,525
APPARATUS AND METHOD FOR PROBING A RADIATED WAVE FIELD
Filed July 12, 1949 5 Sheets-Sheet 2

INVENTOR.
WINSTON WELLS
BY Mock & Blum
ATTORNEYS

INVENTOR.
WINSTON WELLS
BY Mock + Blum
ATTORNEYS

March 31, 1953 W. WELLS 2,633,525
APPARATUS AND METHOD FOR PROBING A RADIATED WAVE FIELD
Filed July 12, 1949 5 Sheets-Sheet 5

FIG. 15.

INVENTOR.
WINSTON WELLS
BY Mock & Blum
ATTORNEYS

Patented Mar. 31, 1953

2,633,525

UNITED STATES PATENT OFFICE 2,633,525

APPARATUS AND METHOD FOR PROBING A RADIATED WAVE FIELD

Winston Wells, New York, N. Y., assignor to Canadian Radium & Uranium Corporation, New York, N. Y., a corporation of New York Application July 12, 1949, Serial No. 104,323

2 Claims. (Cl. 250—1)

My invention relates to a new and improved apparatus for ascertaining the characteristics of an energy field, more particularly in relation to the source of said energy field, and to bodies located within said energy field.

Without limitation thereto, the invention is particularly useful in ascertaining the characteristics of radiated sound waves.

The invention is particularly useful in measuring and plotting the radiation characteristics of a loud speaker over a given frequency range.

According to the known method, a signal of one selected and constant frequency, and having a constant amplitude, is radiated by the loud speaker. According to such known method, a microphone is successively placed at respective different points which are located on a circle, whose center is located at the mean point of origin of the sound wave which is emitted by the loud speaker. Said microphone is coupled to an amplifier, which is coupled to a meter. Readings of this meter are taken at each point at which the microphone is thus located and the data which are thus secured are used to plot a characteristic pattern or graph.

A similar method has been used to plot field patterns for other forms of radiated energy, such as the radiation pattern of an antenna array which is used in transmitting electromagnetic waves, as in radio transmission; also in plotting field patterns of nuclear radiation around radioactive sources and nuclear emitters or devices such as cyclotrons and the like; also in plotting of crystal diffraction patterns, as in the diffraction of Roentgen rays and the like through crystals.

According to the present invention, I have developed a probe type of instrument which is adaptable to the detection of any form of radiated energy and for plotting its field pattern or characteristics. This improved instrument draws no appreciable energy from the field under investigation and it does not distort such field. The improved instrument operates by providing a zone of light which is concentric with the point at which the energy field is being sampled or probed. The intensity of the light in said zone of light is preferably a function of the flux density of the field at the point of sampling or probing. The intensity of the light in said zone of light can be varied either inversely or directly in proportion to the relative flux density at the sampling or probing point. In the case of sound waves, the flux density refers to the energy of the sound wave at the point of sampling or probing.

Other objects and advantages and features of my invention are disclosed in the annexed description and drawings.

The apparatus shown in Figs. 1–14 may be used for probing or scanning the fields of waves whose frequency is as high as 30,000 megacycles, with a wave length as low as one centimeter or less.

Figure 1:
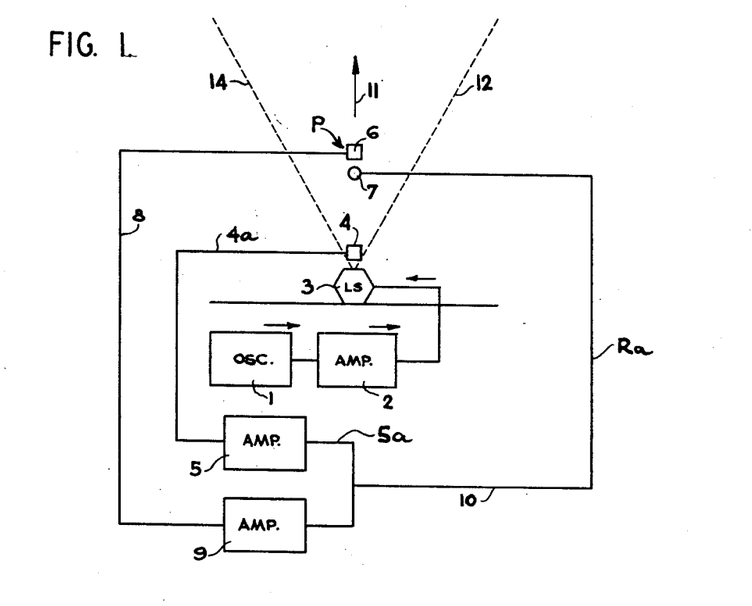
Fig. 1 is a diagrammatic or block view of the means which are used for sampling or probing the flux density.

In Fig. 1, the reference letter 3 designates the source of the radiated field. This source may be of any type, either sonic or electromagnetic, or it may be a source of any type of ray energy which can be utilized to provide a standing wave. In this particular embodiment, the transmitter or emitter element 3 is a loud speaker or other source of sound waves. The letters "L. S." indicate that the element 3 is a loud speaker in this specific embodiment.

The type of pick-up will vary with the type of radiated energy. In this embodiment, which relates particularly to sound waves, the first pick-up member or receiver member 4 is a microphone, which picks up a part of the radiated sound wave, and transforms the sound energy to electrical energy in the usual manner. It is desirable that there should be a minimum or negligible difference in phase between the emitted energy at source 3 and the picked-up energy at the first pick-up member 4. For example, if the emitted energy is a sound wave, the first pick-up member 4 should be located as close as possible to the central point of the radiated wave front which is re-emitted from source 3, so that the picked-up energy at the first pick-up member 4 will be substantially the same in phase as the emitted energy, with minimum difference in phase, and theoretically a substantially zero difference in phase under ideal conditions. When, by reason of a short wave length of the emitted energy or for other reasons, it is impossible to produce a negligible difference in phase between the emitted energy and the picked-up energy at the first pick-up member or receiver, the first pick-up member or receiver can be provided with any suitable phase shifter, so that the output energy of the first pick-up member or receiver is the same in phase as the original radiated wave, or substantially the same in phase.

The output electrical energy of the first pick-up member 4 is supplied along its output line 4a, to a first conventional amplifier 5, which may include one or more amplifying electronic tubes or the like. The current which is supplied along the output line 4a to the first amplifier 5 may be alternating current in some cases, and it may be a modulated unidirectional current in other cases. The invention covers both cases. The output line 5a of the first amplifier 5 is connected through the line 10 and wire Ra to a lamp 7. The lamp 7 is of the type whose intensity of light output is substantially proportional to its input electric energy. This lamp 7 may be a filament lamp or a discharge lamp of any suitable type. The lamp 7 is fixed in any suitable manner to a second or auxiliary receiver or pick-up device 6, which in this case is a microphone. The second receiver or pick-up device 6 and the lamp 7 therefore constitute a probing instrument P. The second pick-up device 6 transforms the picked-up sound energy into electrical energy in the usual manner, and the resultant electric current is transmitted through the output line 8 to the second amplifier 9, which is of any suitable type, and from the second amplifier 9 through its output line 10 and wire Ra to the lamp 7. The intensity of light which is emitted from the lamp 7 will thus be a function of the combined signal strength which is provided by the output currents of the amplifiers 5 and 9, because the line 10 and wire Ra are connected by wire 5a to both amplifiers 5 and 9, in the manner shown in Fig. 1.

The electrical part of the loud speaker 3 is supplied with an electric wave of constant frequency by means of the oscillator 1 and the amplifier 2, and said electric wave may optionally have constant maximum amplitude, so that the loud speaker 3 emits a sound wave which may have constant maximum amplitude and frequency during the test. However, in some cases the frequency of the oscillator 1 may be varied through any desired cycle or even irregularly, so as to supply a field pattern whose antinodes are not at fixed distances from the source of radiation.

Example No. 1

Figure 2:
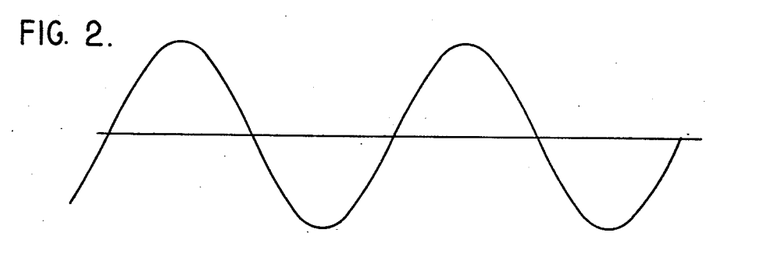
Fig. 2 is a diagram which illustrates a pure sine wave of constant frequency and amplitude, which may be one of the types of emitted waves which are to be probed.

In this example, it is assumed that the loud speaker 3 emits a sound wave of constant frequency and fixed maximum amplitude, said emitted wave being a pure sine wave, as illustrated in Fig. 2. The corresponding input or signal current which is supplied to the lamp 7 will thus produce light emission of constant intensity from lamp 7, because said lamp 7 has sufficient lag so that it does not follow the variations in the received signal current. On the contrary, the light emission from the lamp 7 is a function of the received signal energy. Therefore if the lamp 7 merely receives current from the first amplifier 5, said lamp 7 will emit a steady light of constant intensity under the ideal condition illustrated in Fig. 2.

For the purposes of the test, the probe P is located at a number of different selected points from the mean center of radiation of the wave which is emitted by the transmitter 3. As one illustration, it is assumed that the second pick-up 6 is located at the distance of one wave length from the mean center of radiation. In such case, the current which is supplied to the line 8, and the corresponding amplified current which is supplied by the second amplifier 9, will be exactly in phase with the input current or signal current which is supplied to lamp 7 by the first amplifier 5. In such case, when the second pick-up 6 is thus located, the intensity of the light which is emitted by the lamp 7 will correspond to the arithmetic sums of the respective input or signal currents which are supplied by the amplifiers 5 and 9. It is now assumed that the probe P and the second pick-up 6 are located at a distance of two wave lengths from the mean center of radiation, while the first pick-up 4 is maintained in its original position. In such case, the intensity of light emission of the lamp 7 will decrease as compared to its previous intensity, because the amplifier 9 will now supply less input or signal current to lamp 7 than in the first position of probe P. It is therefore possible to probe and determine the various spherical wave fronts whose distance from the mean center of radiation is one wave length or a multiple of one wave length.

As another illustration, it is assumed that the second pick-up 6 is located at a distance of one-half wave length from the mean center of radiation, or at a distance which is a multiple of one-half wave length from the mean center of radiation. In such case, the energy which is picked up by the second pick-up element 6 will have a phase difference of 180° from the energy which picked up by the first pick-up element 4. Assuming that the amplifiers 5 and 9 deliver equal respective output currents to line 10 and wire Ra, which can be secured by suitable adjustment of the respective amplifications of said amplifiers 5 and 9, the lamp 7 will emit zero light under such circumstances, making it possible to define the respective wave fronts which are at a distance of one-half wave length from the mean center of radiation or at respective distances which are multiples of a half-wave length. Upon locating the second probe P and the second pick-up element 6 relative to the mean center of radiation at points other than those stated in the preceding illustrations, the phase difference between the picked-up energy at 6 and the picked-up energy at 4 will result in varying the light emitted by the lamp 7. The variation of light emission of lamp 7 can be determined by the eye or photographically, or by any means for measuring the intensity of light.

Figure 3:
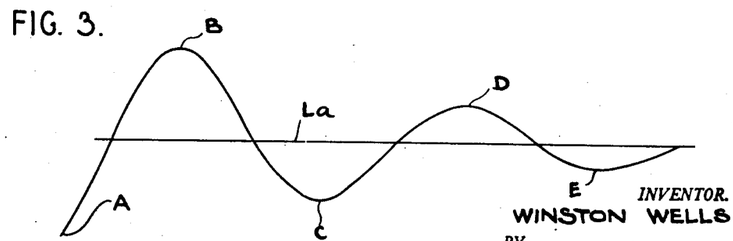
Fig. 3 is a graph which illustrates the intensity of the indication which results in picking up some of the emitted energy at different points from its mean center of radiation.

In Fig. 3, the line La indicates the constant light intensity which is emitted by lamp 7, if the second pick-up 6 is not used. The point A of Fig.

3 illustrates the condition if the second pick-up 6 is used, and it is located at a distance of ½ wave length from the mean center of radiation. In such case, the light emission of lamp 7 is substantially zero.

The point B of the graph of Fig. 3 corresponds to the condition in which the second pick-up element 6 is located at a distance of one wave length from the mean center of radiation. In such case, the intensity of light emitted by lamp 7 is substantially twice the light intensity which is produced by the output current of amplifier 5 alone, although this ratio may be varied. Similarly, the point C illustrates the condition in which the second pick-up element 6 is at 1.5 wave lengths from the mean center of radiation. The point D illustrates the intensity of emission of light of lamp 7 when the second pick-up 6 is at a distance of two wave lengths from the mean center of radiation, and the point E illustrates the intensity of light emitted by lamp 7 when the second pick-up 6 is at 2.5 wave lengths from the mean center of radiation.

In Fig. 1, the lines 14 and 12 indicate two of the directions of the radiated energy, and these lines define a conical zone of radiation. The line 11 indicates the direction of the radiated energy which is intercepted by the second pick-up element 6. In probing by means of the instrument P, said instrument P may be given a to-and-fro movement along the lines 11, 12 14 or any other selected line of radiation. The second pick-up element 6 may be moved continuously or intermittently relative to the source of radiation 3. In the case of intermittent movement, the pick-up element 6 will be held fixed at respective selected stations, during selected periods of time.

The respective outputs of the amplifiers 5 and 9 may be adjusted so that their respective output currents which are supplied to lamp 7 may have any amperage relation. In some cases, the source of light, such as lamp 7, may respond accurately to the change in energy of the received composite current.

Thus, the source of light which may replace lamp 7, may be the known zirconium crater arc which has a perforated electrode, usually made of tungsten, and a companion electrode which has a crater which is filled with zirconium oxide adjacent said opening. When current is passed between these two electrodes, the emitted light is emitted through the opening in the perforated electrode. This arc can be modulated through a frequency as high as 50 kilocycles.

If the light emitted by the probe is photographically recorded, the time lag of the source of light relative to the frequency of the emitted wave should be long, and such time lag should be short relative to the frequency of the scanning movement. By the scanning movement, I mean the movement of the probe P relative to the source of radiation 3. Thus, if I desire to record photographically a sound wave which has a frequency of 1,000 cycles per second, the minimum time lag of the source of light 7 should be 4 milliseconds (0.004 second).

Figure 4:
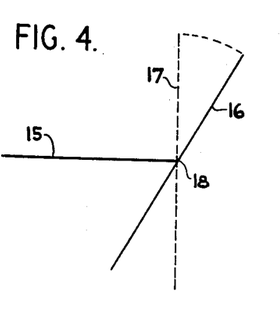
Fig. 4 is a diagrammatic side view which illustrates the method of making a photographic record of the energy of the emitted wave at respective distances from its center of radiation.
Figure 5:
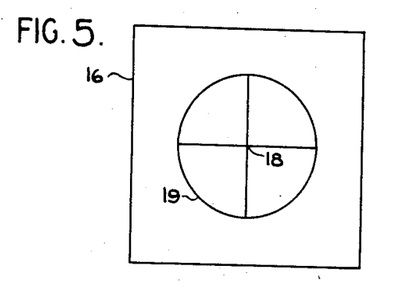
Fig. 5 is an end view of Fig. 4.

In Fig. 4, the line 15 is the optical axis of a camera which is used for photographically recording the sound wave. The broken line 17 indicates a plane which is perpendicular to said optical axis 15. The line 16 indicates a plane which may be perpendicular to the plane of Fig. 4 and which makes any selected angle with the optical axis 15. Fig. 5 shows the point of intersection 18 of Fig. 4 between axis 15 and plane 16 in the plane of Fig. 4, and a circle 19 which is concentric with said point of intersection 18. As one example of a scanning movement, the probe P may be moved unidirectionally, either clockwise or counterclockwise along the circle 19. Due to the inclination of the plane 16 relative to the optical axis 15, and since the circle 19 is located in the plane 16, the movement of the probe P along the circle 19 will be in a path which is elliptical relative to the optical axis 15. If the source of light is a filament lamp 7, such lamp may be wholly or partially enclosed by a casing of roughened Lucite or other material which will diffuse the light of said filament lamp so as to produce a source of light which is uniform, save as modulated by variation of received current. As one example, the source of light may be equivalent to a luminous sphere which has a diameter of one centimeter.

As one example of a scanning movement, the source of light can be moved around the circle 19 in the same direction, and at constant linear velocity. As the speed of movement of the source of light around the circle 19 is increased, it is desirable to decrease the time lag of the filament lamp.

In this type of scanning movement, I provide a scanning path which has one component which is vertical relative to the axis 15, another component which is horizontal relative to the axis 15, and a third component which is along the direction of the axis 15. This three-dimensional scanning movement is desirable.

Figure 6:
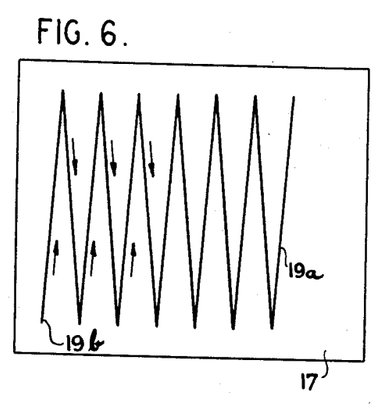
Figs. 6-9 show different respective scanning movements of the probe.

Fig. 6 shows a zig-zag scanning movement 19a in the plane 17 which is perpendicular to the axis 15. Such zig-zag movement may also be in a plane, such as the plane 16, which is inclined to the optical axis 15. This zig-zag path has end-portions 19a and 19b.

Figure 7:
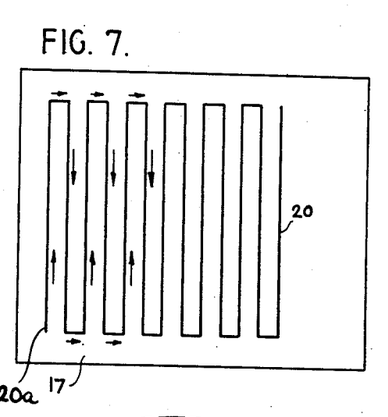

Fig. 7 shows another type of scanning movement which has end-portions 20a and 20. This scanning movement may be in plane 17 or plane 16. In Fig. 6, after reaching the end of the scanning path, the probe P can be moved reversely along said scanning path, or said probe can be moved back to the tip of end-portion 19b, without retracing the scanning path, and the scanning movement can be repeated unidirectionally. Also the respective scanning movements can be in respective planes which are parallel to the plane 17 or to the plane 16.

The scanning movement of Fig. 7 may be either in a plane 17 which is perpendicular to axis 15 or in a plane 16 which is inclined to axis 15, or in a succession of planes which are parallel to the plane 17, or parallel to the plane 16, or in different planes which make different angles with the optical axis 15.

As in the case of Fig. 6, the scanning movements of Fig. 7 may be reversed along the path of scanning movement or they may start at the tip of end-portion 20a, without retracing the scanning movement.

Figure 8:
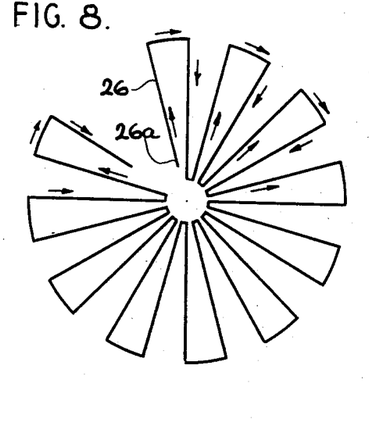

Fig. 8 shows another path 26 of scanning movement which has an end-point 26a, said path 26 being along radial lines which are connected by arcuate lines. This type of scanning movement may be used in the same manner as in Figs. 6 and 7, namely, in a plane 17, or in a plane 16, or in a succession of planes which are parallel to 17 or 16.

Figure 9:
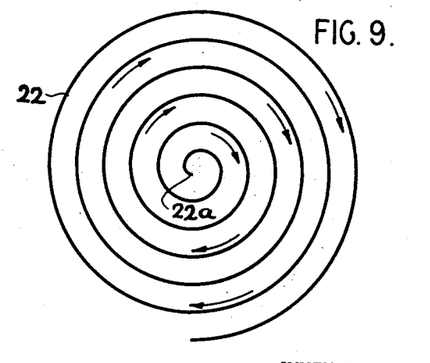
Figure 10:
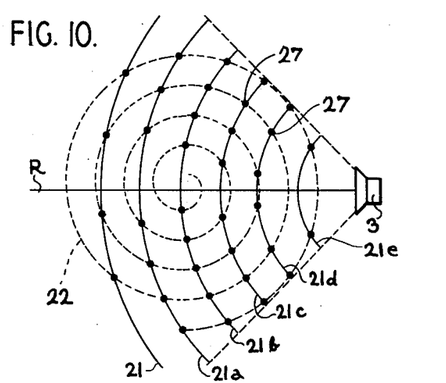
Fig. 10 illustrates the production of a photographic field pattern of the emitted energy.

Fig. 9 shows a spiral scanning path 22 which has a starting point 22a. This can be used in the same manner as the other scanning paths. Fig. 10 diagrammatically shows the source of radiation 3 and a series of arcs 21, 21a, 21b, 21c, 21d and 21e, which are concentric with the mean center of radiation. These arcs therefore define spherical wave fronts which are concentric with the mean center of the source of radiation. The radial distance between the arc or wave front 21e and said mean center of radiation is one wave length, and the spacing between the other arcs is also equal to one wave length.

Fig. 10 shows in broken lines the spiral scanning path 22 and it illustrates how said spiral scanning path intersects the aforesaid wave front lines at respective points 27. By photographically recording the respective light intensity at each point of intersection 27, a photographic field pattern can be accurately recorded. In making a photographic record according to Fig. 10, the diaphragm of the camera is set to a predetermined opening, so that a continuous record is made upon the film. The negative of this film record will have respective relatively dark spots at the points 27, and these dark spots will be connected by photograph records of the lines 21—21e of much less darkness than said dark spots, so that the positive of said film record will show light spots at the points 27, connected by the relatively darker lines 21—21e. The common center of the arcs 21—21e is then determined on the film or other light-sensitive medium. A radial line R is then drawn upon the positive picture, and the distance along said line R between consecutive circular lines 21—21e will give the wave length of the emitted radiation.

In actual practice, the pitch of the spiral path 22 is very small, so that the photographically recorded lines 21—21e will not be as sharply defined as in the diagrammatic illustration of Fig. 10. In actual practice, the photographic record of each of the lines 21—21e consists of a series of closely spaced lines, one of which will be of maximum brightness in the positive.

In such case, the radial distance along line R is measured between the brightest lines of the respective series of lines.

Figures 11, 12:
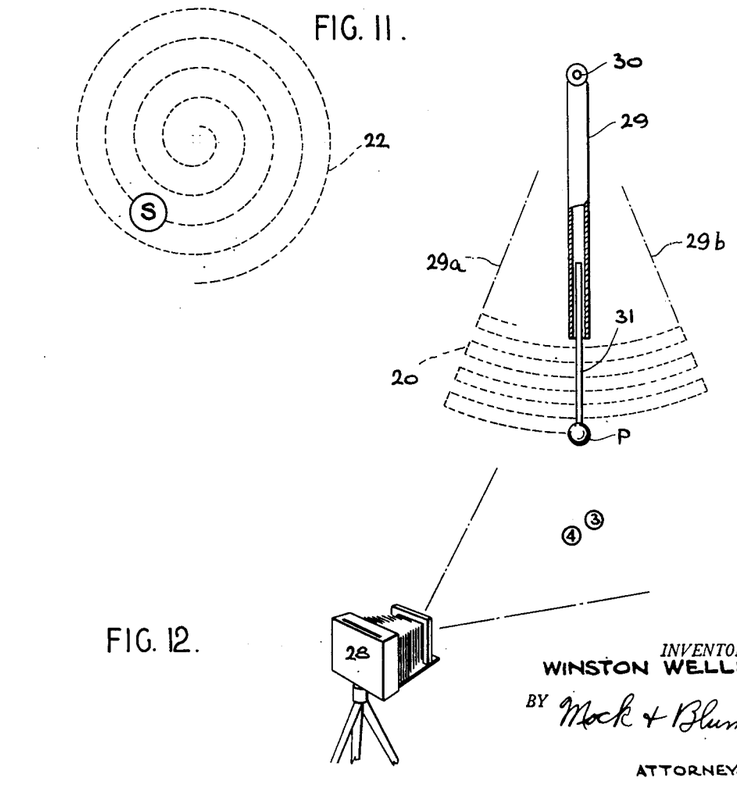
Fig. 11 is a diagram which shows the relation between the effective area of the source of light of the probe and the pitch of the spiral scanning path of Figs. 9 and 10.
Fig. 12 illustrates mechanism for producing the scanning movement of Fig. 7.

Fig. 11 shows the effective area S of the source of light and the relation between the size of said effective area S and the pitch of the spiral scanning path 22. In actual practice and as more desirable, the pitch of the spiral path 22 is sufficiently small so that the area S overlaps two or more adjacent turns of the spiral path 22.

Fig. 12 diagrammatically illustrates mechanism for producing the scanning path of Fig. 7, which is similar to the scanning path used in television receivers and the like. Fig. 12 shows a hollow turnable member 29 which is turnable about a pivot 30, like a pendulum. This hollow rod-like member 29 is oscillated by any suitable means with a constant period of oscillation, through an arc or angle which is indicated by the broken lines 29a and 29b. The probe P is fixed to a rod 31 which is longitudinally slidable in the hollow member 29. By suitable means, the rod 31 is longitudinally advanced or retracted relative to the hollow or tubular rod 29, so that the probe P is moved through the scanning path of Fig. 7. Fig. 12 diagrammatically shows the source of radiation 3, and the first pick-up 4. Said first pick-up 4 is preferably and optionally located close to the source 3, as represented in Fig. 1, and previously described. The first pick-up 4 may be in any spatial relation relative to the camera 28 and the source 3. That is, the first pick-up 4 may be between the camera 28 and the source 3, or said first pick-up 4 may be located above or below the source 3, or the source 3 may be between the camera 28 and the first pick-up 4, as long as the pick-up 4 is located close to the source 3.

As previously noted, suitable phase-correcting means may be used, so that the output current which is supplied by the first pick-up 4, is in phase with the radiation of the source 3, in which case it is not necessary to maintain close proximity of the first pick-up 4 to source 3.

The scanning path may be at any desired part of the field of energy which is supplied by the source 3. That is, the scanning path may be between the camera 28 and the source 3, or the source 3 may be between the camera 28 and the scanning path. Likewise, and assuming that the source 3 is on the optical axis 15 of the camera 28, which is preferred, the scanning path may be above or below the optical axis 15, or partially above and partially below the optical axis 15.

If the source of radiated energy is a sound-emitting device which is electrically energized either by an alternating current or by a modulated unidirectional current, it is not necessary to use the first pick-up 4. In such case, and as one example, the output terminal of amplifier 2 can be directly connected to the lamp 7, or in such case a portion of the output current of the amplifier 2 can be directly supplied to the source of light 7, as one of the components of the composite signal current or probe current or scanning current, and the other component of the composite current or mixed probe current or scanning current or signal current can be supplied through the amplifier 9, in the manner previously described.

If a field of energy of an electromagnetic wave is to be probed and photographically recorded, the oscillator 1 or its amplifier 2 can be connected directly to a transmitting antenna or other transmitting or radiating means, in order to radiate the electromagnetic waves. In such case, a portion of the output current of the oscillator 1 or of the amplifier 2, is supplied to the source of light 7 as one of the components of the composite or mixed probing current or scanning current or signal current. In such case, the receiver or pick-up element 6 is a small pick-up antenna or loop or other pick-up device, whose pick-up current is amplified as desired and supplied as another component of the mixed current or composite probing current or scanning current or signal current to the source of light 7. In such case, a single pick-up element is used, namely, the pick-up element of the probe.

Figure 13:
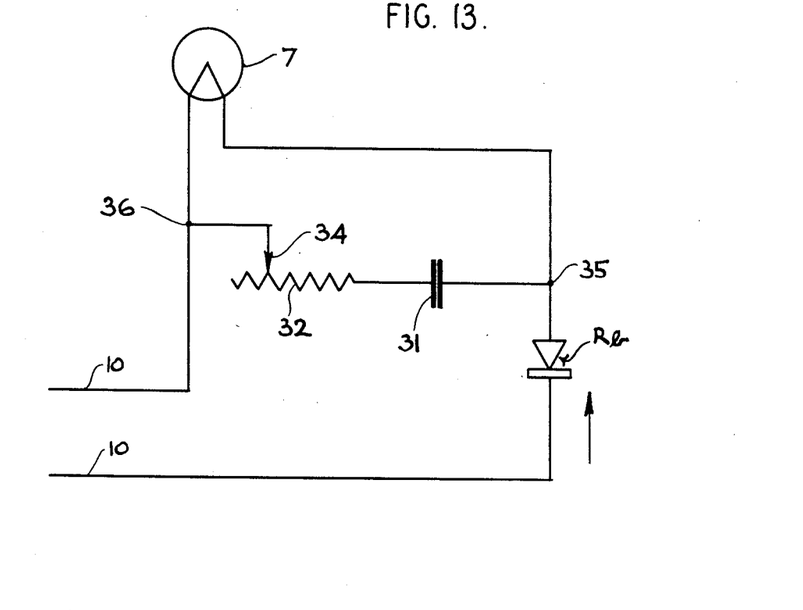
Fig. 13 illustrates a modification of the input line of the source of light of the probe.

Fig. 13 shows the two wires of the output line 10 of Fig. 1 and it shows a rectifier Rb which is provided in one of said wires, so that the mixed or composite alternating signal current or scanning current or probing current is rectified before it is supplied to the source of light 7. Fig. 13 also shows a condenser or capacitor 31, and a variable resistor 32, and a movable tap or contact member 34, whereby the two wires of the output line 10 can be connected in shunt between the points 35 and 36 through the capacitor 31 and any selected part of the resistor 32.

Figure 14:
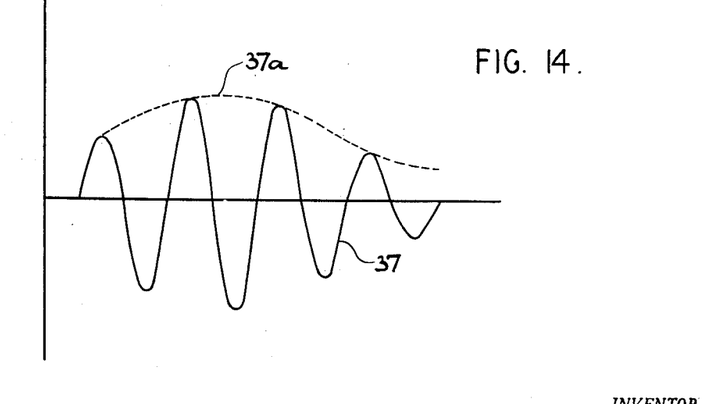
Fig. 14 illustrates the action of the circuit of Fig. 13.

Fig. 14 illustrates the graph 37 of the modulated alternating current which is the mixed signal or scanning or probing current which is rectified through the rectifier Rb. The direction of the rectified current is indicated by the arrow in Fig. 13. This is assumed to correspond to the positive pulses of alternating current in Fig. 14. This rectified current would ordinarily correspond to the respective alternate half-cycles of the alternating current illustrated by graph 37 in Fig. 14 so that in such case the current which is supplied to lamp 7 or other source of light, would consist of a series of intermittent pulses. By providing a capacitor 31 and the variable resistor 32, I connect and smooth out these successive current pulses, thus producing a unidirectional current which has the form illustrated by the graph 37a in Fig. 14. I can use any type of rectifier device and any type of integrating device. By such rectifying and integrating means I can supply a modulated unidirectional current to the lamp 7 or other source of light, whose rate of modulation is much less than the frequency of the alternating current which is supplied to line 10, thus making the variation in light more responsive to the variation of the modulated unidirectional signal current.

As one practical illustration of the use of the filament lamp which is shown in Fig. 13, the time lag of such lamp in response to a current should not be diminished substantially below 0.005 second. In such case, the variation in strength of the signal current which is represented by the line 37a should be slower than 0.005 second, so that the variation in light in the lamp 7 will accurately follow the variation in received current amplitude.

In the illustrative case in which the minimum time lag of the lamp 7 is 0.005 second, the time interval between the points 27 on each of the wave-front lines 21—21e in Fig. 10 should be at least 0.005 second.

Figure 15:
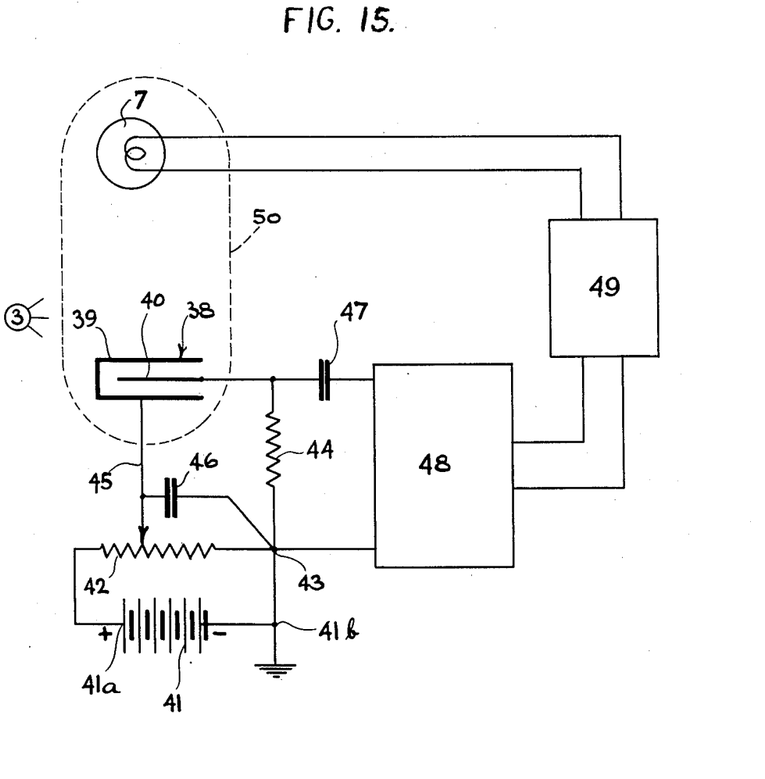
Fig. 15 shows a modification for probing or measuring a radiation field of very high frequency, as a Roentgen ray or gamma ray or beta ray radiation.

Fig. 15 shows an embodiment of the invention for measuring the radiation field of an extremely high frequency radiation, such as a Roentgen ray radiation or gamma ray radiation or beta ray radiation.

Fig. 15 shows the source 3, and it conventionally illustrates, as one type of detector, a Geiger-Müller tube 38, which has the usual external metal cylinder 39 and the usual internal axial electrode 40. A source of unidirectional current 41 is provided, whose positive terminal 41a and whose negative terminal 41b are connected by means of a potentiometer resistor 42. The external cylinder 39 is adjustably connected by an adjustable contact 45 to any selected point of the resistor 42, and the internal electrode 40 is connected to the point 43 by means of a resistor 44 of suitable high resistance, such as 10 megohms. The adjustable contact 45 of the external cylinder 39 is connected to the point 43, by means of the usual by-pass condenser 46. The internal electrode 40 is connected through the capacitor 47, of suitable low capacity, to one terminal of the pulse amplifier 48, whose other terminal is connected to the point 43. According to well-known theory, there will be a series of discharges between the metal cylinder 39 and the internal electrode 40, in a series of pulses which succeed each other very rapidly.

As is well known, each pulse corresponds to the entrance of an energizing particle or ray which is emitted by the source 3, into the interior of the detector or tube 38. The output of the pulse amplifier 48 is connected through an integrator 49, to the terminals of the lamp 7.

This integrating circuit 49 is well known per se, and it is described, for example, at pp. 599–600 of "Radio Engineering" by Terman, published in 1947 by McGraw-Hill Book Company, Inc.

In an integrating circuit, the output voltage is made proportional to the integral of the applied voltage. Thus, an integrating circuit may comprise a large condenser or capacitance in series with a source of constant current, such as a pentode tube or a high resistance. The current which flows through the integrator is proportional to the applied voltage and the output voltage is proportional to $$\frac{1}{C}\int E dt$$

In this embodiment, the Geiger-Müller tube 38 is fixed rigidly to the lamp 7 by any suitable mechanical means, and said tube 38 and lamp 7 are the probe P which is moved through the scanning path 50 shown in broken lines in Fig. 15, or in any of the scanning paths previously described. All the parts illustrated in Fig. 15 are preferably and optionally conveniently mechanically assembled in the fixed relation shown in Fig. 15, so that they can be moved in unison in the probing or scanning path. Also, the Geiger-Müller tube 38 should be made as small as possible within practical limits.

In this case, it is impossible photographically or otherwise to detect definite separated wave fronts, due to the extremely high frequency of the discharges which result from the reception of the particles or rays which are emitted from source 3.

However, the device of Fig. 15 can be used for determining the effect upon the emitted radiation of obstructing bodies which are located between the probe and the source of radiation. Also, if the radiated field is nonsymmetrical, the photographic record of the change in light intensity of the lamp 7 will enable such data to be ascertained, as can also be done in probing a sound energy field or a field of electromagnetic energy.

The use of the integrator circuit 49, which is old and well-known per se, is an important feature of this embodiment. The respective rays or particles are delivered irregularly so that without the use of the integrator circuit, the lamp 7 would flash on and off irregularly or at least it would not deliver light of constant intensity. The integrator circuit is also useful if the probe tube, instead of being a Geiger-Müller tube, is a scintillation counter, a crystal counter, or other counting means for detecting rays or radiations of these particular types.

By using the integrator circuit 49, the lamp 7 is caused to emit a steady light, if there is constant intensity of reception of these radiations. Therefore, the change in intensity of the lamp 7 is an accurate indication of the intensity or flux density of the radiation.

This embodiment is particularly useful in determining the proper dosage of deep ray therapy upon human beings. For example, if such deep therapy is to be applied to the liver or to some other internal part of the body, it is necessary accurately to determine the dosage in order to avoid injury. The common procedure has been to use a tank of water or other shielding medium, which is constructed so as to approximate the shielding effect of the outer tissues and bones of the body. In such case, the plotting of the field intensity is a slow and difficult procedure. By using a probe of the type shown in Fig. 15 in connection with such external shielding means, it is possible quickly and accurately to determine field intensity and thus to determine the proper dosage.

I have disclosed preferred embodiments of my invention, but numerous changes and omissions and additions and substitutions can be made without departing from its scope.

I claim:

1. A method of probing the emitted energy of the field of a radiated wave, which consists in picking up said emitted energy along a succession of pick-up points which are located in a scanning path in said field, said scanning path intersecting a plurality of wave fronts of said radiated wave which are separated by one wavelength of said radiated wave, transforming said pick-up energy to electrical energy, producing light along a series of light-emitting points, each light-emitting point being at a fixed distance from a respective associated pick-up point to provide a respective pair of associated points between which there is a fixed space relation, controlling the illumination at said light-emitting points by said electrical energy, and making a photographic record of said light-emitting points during said scanning.

2. A method according to claim 1 in which said scanning path is spiral, the effective area of said light emitting points being sufficiently large in proportion to the pitch of said spiral path so that said effective area overlaps a plurality of lines of said spiral path.

WINSTON WELLS.

REFERENCES CITED

The following references are of record in the file of this patent:

UNITED STATES PATENTS

| Number | Name | Date |
|---|---|---|
| 1,525,177 | Goldschmidt et al. | Feb. 3, 1925 |
| 2,038,277 | Gent | Apr. 21, 1936 |
| 2,109,189 | Bly | Feb. 22, 1938 |
| 2,184,542 | Belar | Dec. 26, 1939 |
| 2,406,406 | Sandretto et al. | Aug. 27, 1946 |
| 2,489,908 | Larrick | Nov. 29, 1949 |
| 2,504,334 | Iams | Apr. 18, 1950 |
| 2,538,781 | Herson | Jan. 23, 1951 |
| 2,548,836 | Worthington, Jr. | Apr. 10, 1951 |

OTHER REFERENCES

Radio Amateur's Handbook, 1942, pages 225 and 226.